United States Patent [19]

Mølbæk et al.

[11] Patent Number: 4,724,870
[45] Date of Patent: Feb. 16, 1988

[54] FLOW REGULATOR

[75] Inventors: Jens J. Mølbæk, Nordborg; Peter Jørgensen, Horsens; Poul S. Dam, Augustenborg, all of Denmark

[73] Assignee: Danfoss A/S, Nordborg, Denmark

[21] Appl. No.: 633,117

[22] Filed: Jul. 20, 1984

Related U.S. Application Data

[63] Continuation of Ser. No. 528,619, Sep. 1, 1983, abandoned.

[30] Foreign Application Priority Data

Sep. 20, 1982 [DE] Fed. Rep. of Germany ....... 3234779

[51] Int. Cl.$^4$ .............................................. F15D 1/02
[52] U.S. Cl. ........................................ 138/46; 138/43; 138/45; 137/504
[58] Field of Search ................ 137/504, 498; 239/542, 239/570; 138/43, 45, 46

[56] References Cited

U.S. PATENT DOCUMENTS

| | | | |
|---|---|---|---|
| 1,668,681 | 5/1928 | Kirlin | 138/46 |
| 2,762,397 | 9/1956 | Miller | 138/43 |
| 3,097,280 | 7/1963 | Schimming et al. | 137/498 |
| 3,692,043 | 9/1972 | Waskowsky | 137/498 |
| 4,210,172 | 7/1980 | Fallon et al. | 137/504 |
| 4,424,936 | 1/1984 | Marc | 239/271 |

FOREIGN PATENT DOCUMENTS 2018113 10/1979 United Kingdom ............... 239/542

Primary Examiner—John W. Shepperd
Attorney, Agent, or Firm—Wayne B. Easton

[57] ABSTRACT

A flow regulator is disclosed having a body with a central bore and a dished shaped surface with a tapered groove from the bore to the periphery, a diaphragm is fastened to the periphery of the body with a passage extending around the periphery providing fluid communication between the upstream side of the diaphragm and the tapered groove, a spring is provided to bias the diaphragm towards the upstream side, the diaphragm is inelastically deformable against the dish shaped surface solely in accordance with the resistance to deformation of the spring and the fluid pressure on the upstream side of diaphragm to regulate the volume flow of fluid through the central bore.

7 Claims, 6 Drawing Figures

FLOW REGULATOR

This is a continuation of application Ser. No. 528,619 now abandoned.

The invention relates to a flow regulator in which a diaphragm deformable against elastic forces is disposed between an inlet pressure chamber and an outlet pressure chamber which is bounded by a dished abutment wall in which there is provided at least one radial groove connected at the radially outer end to the inlet side.

According to previous Application No. P 32 23 206.3, with an increase in the differential pressure the diaphragm comes to lie ever more closely against the conical abutment surface. In this way, an increasing length of the radial groove is covered by the diaphragm so that there is formed a throttle passage of increasing length which throttles the flow depending on the pressure difference between the inlet pressure and outlet pressure. In the known case, the elastic forces arise exclusively from the elasticity of the diaphragm material. Since the variability in the choice of the diaphragm material is not too large, the characteristic curves that can be achieved for the regulator likewise lie within a restricted range. In particular, it is difficult to design the regulator for very large alterations in the differential pressure. In addition, the elasticity of the diaphragm material changes in relation to the temperature, through ageing or as a result of a chemical influence by the flow medium to be regulated. As a result, the regulator alters its properties.

A flow regulator is also known (DE-AS No. 10 49 176), in which a thick flat elastic disc co-operates with a flat abutment face in which radial grooves are provided. Throttling is in this case brought about depending on the differential pressure in that the disc is depressed to a greater or less extent into the radial groove and reduces the cross-section of the latter. The effect of a reducing effective diaphragm area with an increase in the pressure difference does not occur in this case.

The invention is based on the problem of providing a flow regulator of the aforementioned kind which makes it possible to set the characteristic curve of the regulator more freely and more accurately than hitherto.

This problem is solved according to the invention in that the central region of the diaphragm is biassed by a spring.

This spring produces the elastic forces in conjunction with the diaphragm but preferably substantially on its own. By selecting the spring, the characteristic curve of the regulator can be set over a wide range. In particular, it is not difficult to let the regulator work between zero differential pressure and a very large differential pressure. The position of the spring ensures that its entire force still acts on the effective part of the diaphragm, i.e. the part that is not supported by the abutment face. Since the effective surface decreases with an increase in differential pressure, regulation is still possible at really high differential pressures. Further, a spring is far less sensitive to ageing, chemical attack and temperature influences, so that, once chosen, the characteristic curve will be substantially maintained during the entire operating period.

Different characteristic curves will result not only from selecting different springs but also by installing the spring with a prestress which is likewise freely selectable.

Preferably, the prestressing of the spring is adjustable. For a given spring one can then utilise the entire range of prestressing, starting with zero prestressing.

Another possibility for influencing the characteristic curve of the regulator is by having an abutment wall which departs convexly or concavely from a conical surface. Under otherwise the same conditions, this results in different gradients for the starting sections of the characteristic curves.

In a preferred embodiment, the diaphragm is shaped to correspond to the abutment wall. The diaphragm is thereby adapted to have part of its surface supported by the abutment face in all the intermediate positions without requiring any elastic deformation. The diaphragm can therefore be made of an entirely or predominently inelastic material so that the influences of the diaphragm material on the characteristic curve of the regulator can be kept small.

Preferred examples of the invention will now be described in more detail with reference to the drawing, wherein.

Figure 1:
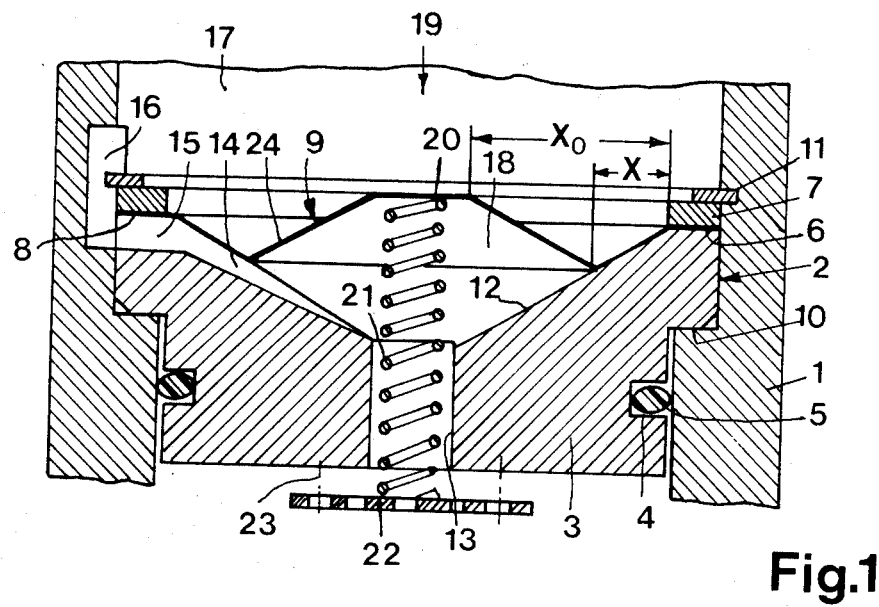
FIG. 1 is a cross-section through a first embodiment of a flow regulator according to the invention.

FIG. 1 shows a tube 1 in which a flow regulator 2 is inserted. The regulator comprises a body 3 carrying a sealing ring 5 in a circumferential groove 4. The margin 8 of a diaphragm 9 is clamped between an end face 6 of the body 3 and a retaining ring 7. The body 3 and the retaining ring 7 are held between a step 10 of the conduit 1 and a spring ring 11.

The body has a conical abutment face 12 and a central bore 13. A radial groove 14 provided in the conical abutment face 12 has a cross-section which decreases from the outside to the inside. The radially outer end 15 of the radial groove is connected by way of an axial groove 16 to the inlet pressure chamber 17 above the diaphragm 9. An outlet pressure chamber 18 is disposed between the diaphragm 9 and the abutment face 12. The arrow 19 shows the direction of flow.

The diaphragm 9 has a central region 20 which is biassed by a helical spring 21. The latter extends through the central bore 13 and is supported at the other end on a supporting plate 22. The latter is axially adjustable by means of screws 23 (of which only the position is indicated) so as to adjust the prestressing of spring 21. The diaphragm portion 24 between the central region 20 and the margin 8 has a conical shape approximately conforming to that of the abutment face 12.

Instead of the illustrated single radial groove 14, there may be a plurality of parallel radial grooves or a plurality of grooves which are selectively made effective either alone or in combination as shown in Application No. P 32 23 206. The cross-section of radial groove 14 can change in height as well as in width.

If, in operation, there is no flow, diaphragm 9 is pressed by spring 21 into an upper position in which the diaphragm makes no contact with the abutment face 12 at all and the radial groove 14 is therefore fully exposed. If the pressure in the inlet pressure chamber 17 rises, the diaphragm is pressed downwardly against the elastic force of spring 21. It therefore comes to lie partially against the abutment face 12. The radial groove 14 is therefore covered over the length x and forms a corresponding throttling passage. At the same time, the part of the diaphragm 9 subjected to the pressure difference between the inlet pressure and outlet pressure decreases. However, the spring 21 continues to operate with its full force. Consequently, each differential pressure $\Delta P$ is associated with a particular position of equilibrium between the diaphram and spring resulting in a predetermined coverage x. Maximum coverage $x_o$ and thus maximum throttling are obtained when the part 24 of diaphragm 9 lies completely against the abutment face 12.

Figure 2:
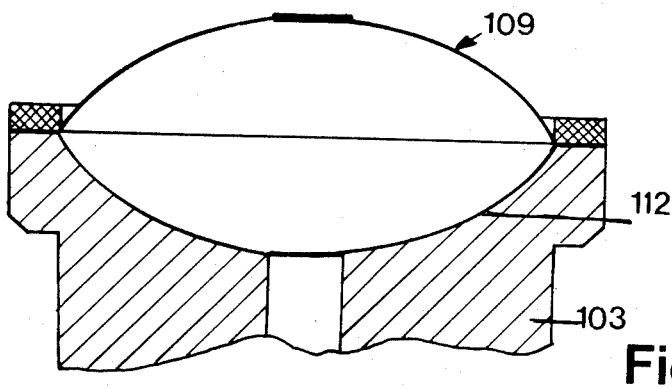
FIG. 2 is a second embodiment in which the spring is omitted.

FIG. 2 shows a body 103 of which the abutment face 112 departs concavely from the conical surface. The diaphragm 109 has a shape corresponding to this abutment face. This results in a steeper starting region for the characteristic curve.

Figure 3:
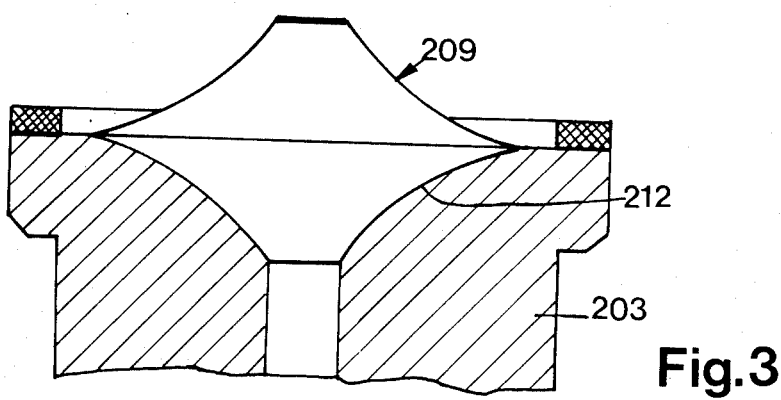
FIG. 3 is a third embodiment in which the spring is omitted.

In FIG. 3, the body 203 is provided with an end face 212 which departs convexly from the conical surface. It co-operates with a diaphragm 209 conforming to the abutment face 212. This results in a flatter starting section of the characteristic curve.

Figure 4:
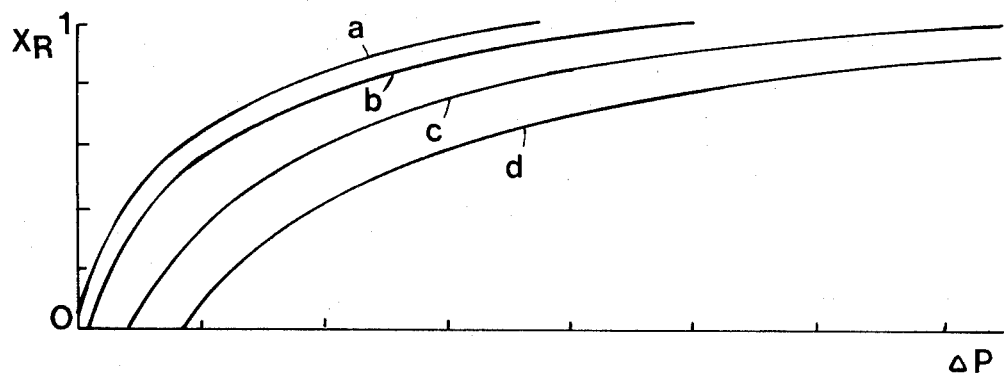
FIGS. 4 to 6 show different characteristic curves for the regulator.
Figure 5:
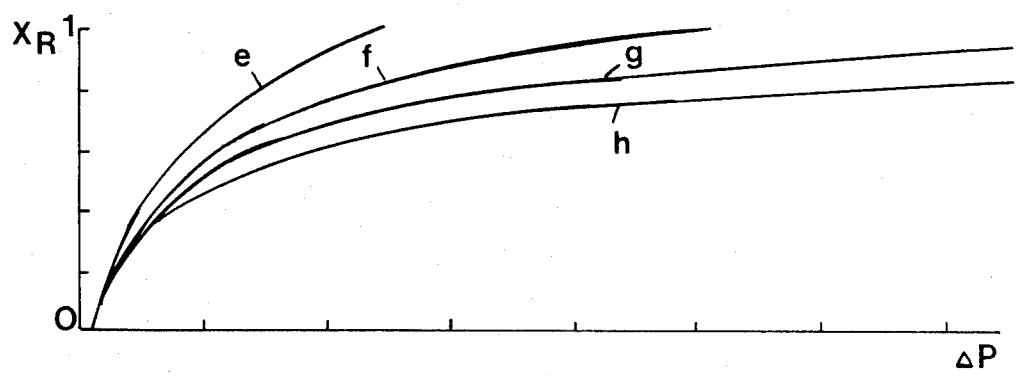
Figure 6:
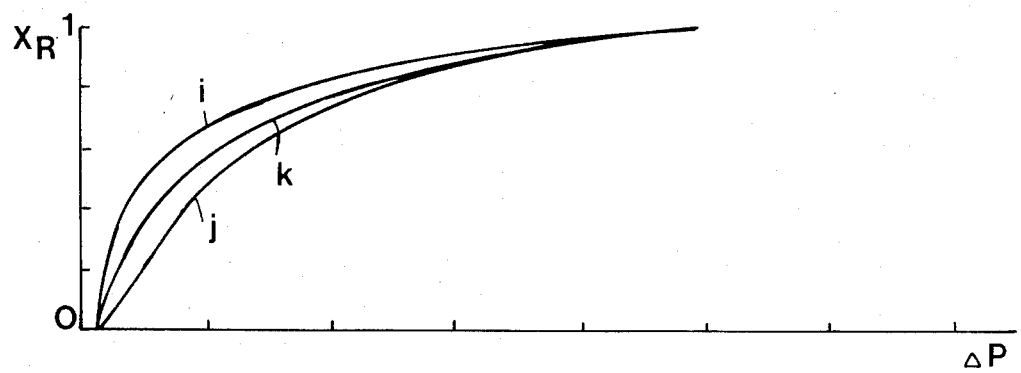

The graphs of FIGS. 4 to 6 show the relative degree of coverages $x_R = x/x_o$ against the differential pressure $\Delta P$. FIG. 4 shows four characteristic curves in which the same spring 21 is used but with prestressing increasing from a to d. The amount of prestressing can be changed with the aid of the supporting plate 22.

FIG. 5 shows characteristic curves e to h for diaphragms with different conditions between maximum and minimum diaphragm surface.

FIG. 6 shows characteristic curves i to l, which apply to different shapes of the abutment face when using the same spring and the same prestressing. More particularly, the characteristic curve i applies to the convex abutment face of FIG. 2, characteristic curve k to the conical surface in FIG. 1 and characteristic curve l to the concave abutment face in FIG. 3.

By combining a spring of which the characteristic curves have a particular gradient with a certain prestressing and with a certain form for the abutment face, characteristic curves can be achieved for the regulator that are very accurately adapted to individual requirements and that permit the quantity of flow to be held substantially constant over a wide range of differential pressures.

What is claimed is:

1. A flow regultor, comprising, a casing, a partition body separating upstream and downstream sides of said casing, said partition body having a central bore and a generally dish shaped surface on said upstream side, a thin, flexible and imperforate diaphragm in said casing on said upstream side, means fastening the margin of said diaphragm relative to the periphery of said dish shaped surface, groove means in said dish shaped surface between the periphery thereof and said central bore, passage means extending around said periphery of said diaphragm providing fluid communication between said upstream side and the radially outward part of said groove means, spring means having one end thereof fixed relative to said partition body, said spring means biasing said diaphragm towards said upstream side, said diaphragm being inelastically deformable against said dish shaped surface to varying degrees solely in accordance with the resistance to deformation of said spring means and in accordance with the magnitude of fluid pressure on said upstream side to provide degrees of throttling of said groove means by said diaphragm corresponding to changes in the magnitude of fluid pressure on said upstream side to regulate the volume flow of fluid through said central bore.

2. A flow regulator according to claim 1 wherein said spring means extends through said partition body central bore.

3. A flow regulator according to claim 1 wherein said dish shaped surface has a conical shape.

4. A flow regulator according to claim 1 wherein said dish shaped surface is concave relative to said upstream side.

5. A flow regulator according to claim 1 wherein said dish shaped surface is convex relative to said upstream side.

6. A flow regulator according to claim 1 wherein said diaphragm is sufficiently thin and flexible so that a radially outward portion thereof may lie flat on said surface while the inner portion thereof is held off of said surface by said spring means.

7. A flow regulator according to claim 1 wherein said diaphragm is of a substantially inelastic material to minimize the influence of the material of said diaphragm of the characteristic curves of said regulator.

* * * * *